Patented July 29, 1930

1,771,461

UNITED STATES PATENT OFFICE

LEON LILIENFELD, OF VIENNA, AUSTRIA

CELLULOSE SOLUTIONS AND PROCESS FOR MAKING SAME

No Drawing. Application filed May 10, 1924, Serial No. 712,476, and in Austria May 25, 1923.

I have discovered that ammonia derivatives of carbon dioxide (that is to say bodies produced by anhydro-synthetic combination of one or more molecules of carbon dioxide with one or more molecules of ammonia) and ammonia derivatives of sulphur derivatives of carbon dioxide in presence of alkalies exert a dissolving action upon cellulose and its conversion products or derivatives.

According to the particular nature of the body of the cellulose group, which is to be dissolved, the alkali solution in presence of the aforesaid carbon dioxide derivatives dissolves the body, either at room temperature or at temperatures between room temperature and 0° C. or only below 0° C. In this respect, it may be taken as a rule, by which, however, the invention is not to be limited, that with the same cellulosic body the solvent action of a more concentrated alkali solution occurs at higher temperatures than that of a more dilute solution and that with alkali lye of the same strength disintegrated cellulose passes into solution at higher temperatures than does that which is slightly disintegrated or not disintegrated.

In illustration of this behaviour, it may be stated as an example that in alkali solutions containing an ammonia derivative of carbon dioxide or of a sulphur derivative of carbon dioxide, those conversion products which may be obtained by separation from solutions of cellulose in suitable solvents (for instance strong mineral acids, ammoniacal cupric oxide, zinc chloride) or from viscose, dissolve, as a rule, even at room temperature; mercerized cellulose or highly bleached cellulose or bleached and mercerized cellulose dissolves round about 0° C. and slightly disintegrated or not disintegrated cellulose only below 0° C. In any doubtful case it is easy to determine the proper temperature by a simple preliminary test, namely by mixing the cellulosic body with an alkali solution (for example caustic soda lye of 10 per cent. strength) containing the said ammonia derivative of carbon dioxide or of a sulphur derivative of carbon dioxide and, if dissolution does not occur at room temperature, cooling by stages until a solution is produced which when spread on a glass plate and treated with dilute sulphuric acid forms a film fit for use.

Of the ammonia derivatives of carbon dioxide or of sulphurized carbon dioxide the following have proved particularly useful for the present process: Urea and derivatives thereof, thiourea and its derivatives, dicyanodiamide and its derivatives, guanidine and its derivatives, and urethanes.

The conduct of the process will now be described and a series of examples given for the purpose of illustration. It is not intended, however, to limit the invention to the details of this description.

As parent materials for the process there come into consideration:

(1) Bleached and unbleached cellulose of every kind and in every form in which it is available;

(2) Materials of every description containing cellulose;

(3) Cellulose conversion products of every kind, thus, for instance, the cellulose conversion products (probably cellulose hydrates) formed by mechanical comminution of the cellulose in presence of water;

(4) The cellulose conversion products obtained by treating cellulose with oxidizing or reducing bleaching agents;

(5) The cellulose conversion products obtained by heating cellulose alone or in presence of water or glycerine or salts of any kind at normal or increased pressure;

(6) The cellulose conversion products (cellulose hydrates) produced by treating cellulose with alkali lye of various concentrations (mercerized cellulose), with or without subsequent washing, with or without subsequent treatment with a dilute acid and with or without previous or subsequent or simultaneous treatment with bleaching or oxidizing agents;

(7) The cellulose conversion products produced by treating cellulose with hot alkalies;

(8) The cellulose conversion products which are separated—and where necessary washed—by suitable precipitating agents or other means, from solutions of cellulose or cellulose hydrates, for example from solutions of cellulose or cellulose hydrates or hydrocelluloses in ammoniacal cupric oxide or any other solvent containing copper as its basis; or from solutions of cellulose or cellulose hydrates or hydrocelluloses in zinc halides, for example zinc chloride alone or in presence of acids or other salts; or from solutions of cellulose or cellulose hydrates or hydrocelluloses in strong mineral acids, such as sulphuric acid, phosphoric acid, hydrochloric acid, arsenic acid and the like; or from solutions of cellulose xanthates (when decomposed spontaneously or by other means);

(9) Artificial threads of every description produced from cellulose or cellulose conversion products or cellulose derivatives, such as artificial silk, artificial silk waste, artificial cotton, staple fibre and the like;

(10) The cellulose conversion products obtained by treating cellulose or its conversion products with strong mineral acids, zinc chloride or ammoniacal cupric oxide, but short of dissolution;

(11) Hydrocellulose of every kind, such as is obtained, for example, by treating bleached or unbleached cellulose with dilute acids in the cold or at raised temperature under ordinary or increased pressure or by drying in presence of acids;

(12) Oxycelluloses of every kind;

(13) The cellulose conversion products obtainable from cellulose derivatives such as esters or the like by scission of the molecule or by saponification, such as, for example, denitrated cellulose nitrate or saponified cellulose acetate or formate or the like;

(14) Cellulose derivatives formed from cellulose by introduction of radicles by addition or substitution for the purpose of making the product soluble in aqueous alkalies. These include, for example, the alkali-soluble cellulose derivatives obtained by treating cellulose or cellulose conversion products with alkylating agents (see for example U. S. Patent No. 1,589,606).

The aforesaid conversion or oxidation products of cellulose, in so far as their method of production permit thereof, may be soluble, or soluble with difficulty or incompletely soluble or insoluble, in aqueous alkalies at room temperature. They may be used dry, air-dry, moist or wet.

In the following description and claims, wherever the meaning admits, the expression "cellulose" or "parent material" or "body of the cellulose group" is intended to comprise one or more or all of the parent materials enumerated above, and the expression "cellulose conversion products" is intended to comprise one or more or all of the materials enumerated as parent materials in the passages above numbered 3 to 13, both inclusive.

The conduct of the process is simple. It consists essentially in treating the parent material, while stirring, until dissolution occurs, with an aqueous alkali solution containing an ammonia derivative of carbon dioxide or of a sulphur derivative of carbon dioxide, or mixtures of such substances as are able to form an ammonia derivative of carbon dioxide or of a sulphur derivative of carbon dioxide, or substances capable of being decomposed with formation of ammonia derivatives of carbon dioxide or of a sulphur derivative of carbon dioxide. This treatment may be conducted either by dissolving the derivative of the carbon dioxide or sulphur derivative of carbon dioxide in the alkali solution and introducing the parent material into this solution, or even by mixing the parent material with the alkali solution and only then adding the carbon dioxide derivative.

If dissolution is accomplished while cooling, it is preferably effected in a vessel adapted to be cooled either externally or internally or both externally and internally and having, in addition, a mixing, kneading or stirring device.

With regard to the strength of the alkali solution, it has been found that in presence of the carbon dioxide derivatives in question, caustic soda lye even of 2 per cent strength and up to 16 per cent strength has a dissolving effect. According to the present state of the process alkali lyes corresponding, say, with a caustic soda lye of less than 15 per cent strength, for example caustic soda lye, of from 4–12 per cent strength, may be indicated as preferable.

As to the proportion to be used of the derivatives of carbon dioxide or of sulphur derivatives of carbon dioxide, satisfactory results are obtained even with very small proportions, for example from 2–10 per cent of the weight of the parent material. Much larger proportions may, however, be used, for example an amount equal in weight to that of the parent material or more.

The solutions obtained according to the present process, if necessary after previous filtering or straining or centrifuging, may be used for the manufacture of technical products, such as artificial threads and yarns (for example artificial silk, artificial cotton, staple fibre and the like), artificial hair, films of every kind, plastic masses, coatings of every kind on paper, textiles, leather and the like, dressings and fillings of fabrics, sizing of yarns, book cloth, artificial leather and the like.

The solutions are easily worked up into technical products, since they are readily coagulated by suitable precipitating baths, such as inorganic or organic acids, salts alcohols, in some cases even water, or by heat, steam and the like.

The following examples illustrate the invention, the parts being by weight:—

*I*

(a) 12 parts of bleached cotton in the form 288 parts of caustic soda lye of 8-10 per cent strength at room temperature, preferably while stirring or kneading, to produce a homogeneous mass. If the parent material readily absorbs the caustic soda lye or is rapidly subdivided therein, the stirring operation may occupy only 10-15 minutes. The mixture may, however, be stirred, or left at rest, for some hours, so as to impregnate uniformly the medicated cotton wool with the lye. After the mass has become homogeneous, 10-20 parts by weight of thiourea, preferably previously pulverized, are added and the whole is thoroughly stirred. The mixture is then cooled in a vessel having an external or internal or both an external and internal cooling device and adapted to reduce the temperature to that desired (for example the vessel may be surrounded by a freezing mixture at about $-15°$ C. to $-25°$ C., or by a double jacket which can be cooled with or without cooled mixing blades or a cooling worm or the like) and during this operation the mass is stirred, kneaded, shaken or otherwise agitated. When the temperature of the mass has fallen to $-9°$ C. to $-11°$ C. which starting from the beginning of the cooling operation occurs in about 10-20 minutes, it is slightly frozen and resembles a milky lard in consistence and appearance. Cooling is now interrupted and the temperature of the solution is raised to room temperature. This may be done, while stirring, either at room temperature or, in order to accelerate the process, while gently heating. As soon as the temperature of the mass has risen to room temperature, there is present a solution practically free from crystals and undissolved constituents; should it still contain any it may be freed therefrom by filtering or straining. Spread on a glass plate and treated with dilute sulphuric acid (for example of 10-20 per cent strength) the solution yields a clear, firm film.

(b) The mode of operation is as in (a), with the difference that the mass is kept for 10-12 minutes at $-10°$ C. to $-11°$ C.

(c) The mode of operation is as in (a) or (b), with the difference that the thiourea is dissolved in the caustic soda lye before the introduction of the medicated cotton wool.

II

Into 480-600 parts of a solution of guanidine of 10-30 per cent strength in caustic soda lye of 8-10 per cent strength, 20 parts by weight of finely subdivided cellulose, for example sulphite-cellulose, are introduced and the mixture is stirred for a considerable time at room temperature. Thereupon is produced a very viscous solution, in which a moderate quantity of undissolved fibres is distributed. The mixture or the not-quite-complete solution is now cooled as in I (a) or (b), while stirring, whereby there is produced a practically perfect solution which, if necessary, may be freed from any undissolved constituents by straining or filtering or centrifuging.

Spread on a glass plate and treated with a suitable precipitating bath, for example dilute sulphuric acid, the solution yields a transparent film.

III 100 parts of sulphite-cellulose in fleece or sheet-form are stirred with 1000-2000 parts of water until the whole is homogeneous; after standing for several hours or several days the product is pressed or centrifuged until it weighs 125-150 parts. The product is ground or comminuted for several hours up to 8 days in a suitable apparatus (for example a shredder, beater, kneading machine or the like).

(a) A quantity of this parent material corresponding with 10 parts of the air-dry sulphite-cellulose are mixed with caustic soda lye of suitable concentration, so that the mixture contains 10 parts by weight of air-dry sulphite-cellulose and 160-240 parts of caustic soda lye of 8-10 per cent strength. After having been stirred until homogeneous, there are introduced into this mixture 10-15 parts of thiourea, preferably pulverized, and the whole is stirred for some minutes. The mass is then cooled as in I (a) or (b) to $-11°$ C. and kept at this temperature for 1-10 minutes, during which the mass freezes in the form of a thin lard. After thawing, there results a viscous, but liquid, clear solution practically free from undissolved constituents which—if desired, after previous straining or filtering—spread upon a glass plate and treated with dilute sulphuric acid yields a transparent, strong film.

(b) The mode of operation is as in (a), with the difference that a caustic soda lye of 6 per cent strength is used and the mass kept for 20-40 minutes at $-11°$ C. Owing to the use of weaker lye the mass freezes more intensely.

The result is roughly as in (a).

IV

A quantity of the parent material as in III corresponding with 8 parts of air-dry sulphite-cellulose is bleached for some hours, at room temperature, with 100-300 parts by weight of eau de javelle of 10° Baumé specific gravity acidified with acetic acid; then thoroughly washed with water and pressed or centrifuged. The residue is stirred with a suitable proportion of a caustic soda lye of suitable concentration, so that 100 parts of the mixture contain 8 parts of dry substance and 92 parts of caustic soda lye of 6-8 per cent strength. After the mixture has been stirred until homogeneous, 6-10 parts of pulverized thiourea are added, the mass is stirred and cooled as in I (a) or (b), while stirring, to −10° to −11° C. and kept at this temperature for 20–40 minutes, during which the mass freezes to a form resembling lard. After thawing, there appears a clear viscous, but liquid, solution, which yields a film clear and strong in the wet state and transparent and flexible when dry.

V 100 parts of sulphite-cellulose in fleece or sheet form are impregnated with 800–1000 parts of caustic soda lye of 18 per cent strength and after standing for several hours—up to 24 hours—the whole is pressed or centrifuged until it weighs 200–300 parts. The residue is then finely comminuted and either immediately after comminution or after short or prolonged ripening, for example for 3 days, at room temperature, is washed free from alkali with cold or hot water, pressed or centrifuged to remove adherent water and dried or used in the moist state. After washing, however, the mercerized cellulose may still receive a short treatment with a dilute acid (for example sulphuric acid of 5–10 per cent strength), then be washed free from acid, pressed or centrifuged and dissolved either dried or in the wet state. For the sake of simplicity, the rest of this example deals with the air-dry material.

(a) 10 parts of thiourea, preferably pulverized, are stirred or triturated with 190 parts of caustic soda lye of 5 per cent strength, whereby dissolution occurs. Into this solution 10 parts of the air-dry mercerized cellulose are introduced and the whole is stirred until homogeneous. The mass is then cooled as in I (a) or (b) to −11° C. and kept at this temperature for 20–40 minutes. Hereby it freezes to a lard-like mass, but can still be stirred. After thawing, the result is a solution practically free from undissolved constituents which yields a film clear and strong in the wet state and transparent and flexible when dry.

(b) 10 parts of the air-dry mercerized cellulose are stirred with 150–200 parts of caustic soda lye of 6 per cent strength until homogeneous, whereupon 10–15 parts of thiourea, preferably pulverized, are introduced. The well-stirred mass is now cooled as in I (a) or (b) to −11° C., whereby it freezes but can still be stirred. The mass is kept at this temperature, while stirring, for 20–40 minutes. After thawing, the result is a clear solution practically free from undissolved constituents, which yields a film clear and firm while wet and transparent and flexible when dry.

(c) The mode of operation is as in (b), with the difference that instead of caustic soda lye of 6 per cent strength, a caustic soda lye of 8–10 per cent strength is used and the mass is kept as −11° C. for only 1–5 minutes. The result is approximately as in (a).

(d) 10 parts of the air-dry, mercerized cellulose are stirred or kneaded with 190 parts of caustic soda lye of 10 per cent strength until the mixture is homogeneous. Then 2–6 parts of thiourea, preferably pulverized, are stirred in, whereupon the mixture is cooled, while stirring, to −9° to −10° C., whereby it freezes to a form like thin lard. Directly after its temperature has fallen to this degree or about two minutes later, cooling is interrupted and the temperature of the mass raised to room temperature. The solution thereby produced yields a film which is strong while wet and transparent and flexible when dry.

(e) 10 parts of the air-dry mercerized cellulose are stirred with 150–200 parts of caustic soda lye of 6 per cent strength, until the mixture is homogeneous. 10–20 parts of pulverized urea are then stirred in and the mass is cooled as in I (a) or (b) to −10° to −11° C. and kept for 20–40 minutes at this temperature, at which slight freezing occurs. On thawing, the mass passes over into a viscous, but liquid, solution, practically free from undissolved constituents, yielding a film which is strong while wet and transparent and flexible when dry.

(f) The mode of operation is as in (e), with the difference, that instead of caustic soda lye of 6 per cent strength caustic soda lye of 8–10 per cent strength is used and that the mass is kept at −10° to −11° C. only 1–3 minutes. The result is as in (e).

(g) 10–15 parts of dicyano-diamide, preferably pulverized, are stirred with 200–240 parts of caustic soda lye of 6 per cent strength, whereupon 10 parts of the air-dry mercerized cellulose are introduced and the whole is stirred until homogeneous. The mass is then cooled as in I (a) or (b) to −10° to −11° C., while stirring, and is kept at this temperature, while stirring, for 10–40 minutes, during which the mass freezes but can still be stirred. After thawing, there is produced a liquid solution which yields a film clear and firm while wet and transparent and flexible when dry.

VI

Into 1000–2000 parts of sulphuric acid of 60° Baumé specific gravity, cooled to −12° C., 100 parts of finely-subdivided sulphite-cellulose are introduced in small portions while kneading, rubbing or mixing and continuously cooling. The introduction occupies about 20 minutes. The temperature of the mass is kept at about −10° to −11° C. during the introduction. After the whole of the sulphite-cellulose is incorporated with the sulphuric acid, there is present a tough dough which may be rolled out on a glass plate, and, in a thin layer, appears transparent.

While continuously cooling, this dough is kept for another half-hour to one hour at −10° to −12° C., while stirring, and is then kneaded with ice water, which is added in small portions, until the dough is entirely precipitated. The precipitated product (if desired, after previous pressing for recovering the sulphuric acid) is washed with water until sulphuric acid is no longer to be found in the washing water and a test portion of the body itself, boiled with water, no longer yields sulphuric acid to the water. To accelerate the washing operation, the more or less coarse product may be triturated or ground in the moist state once or several times during the washing. The washed body is now pressed or centrifuged, if necessary again triturated or ground, and either dissolved in the wet state according to the invention or previously dried in a vacuum or in the air. If the body is used in the wet state, the water content must previously be determined.

(a) A quantity of the above-described parent material corresponding with 10 parts of the dry residue is mixed with caustic soda lye of suitable concentration so that the mixture contains 130–190 parts of caustic soda lye of 8–10 per cent strength to 10 parts of dry residue. After stirring for about 10–15 minutes at room temperature, the cellulosic body swells to a vitreous form. Spread upon a glass plate and treated with dilute sulphuric acid the swollen mass yields no coherent film, but a skin which is broken when rubbed or pulled. Into this mass 5–20 parts of thiourea, preferably pulverized, are now introduced and the mixture is stirred or kneaded at room temperature until complete dissolution occurs, which requires about half an hour to two hours. There results a slightly viscous, liquid, clear solution, practically free from undissolved constituents. When large proportions of thiourea are used there is usually found suspended in the solution some undissolved thiourea, which, however, settles when left at rest. Spread on a glass plate and treated with a suitable precipitating bath, for example dilute sulphuric acid, the solution yields a film, which is clear and firm while wet and transparent and flexible when dry.

(b) The mode of operation is as in (a), with the difference that urea is used instead of thiourea.

(c) The mode of operation is as in (a), with the difference that guanidine is used instead of thiourea.

(d) The mode of operation is as in (a) or (b) or (c), with the difference that the thiourea, or urea, or the guanidine is incorporated with the caustic soda lye before the introduction of the cellulosic body.

VII (a) 6–20 parts of pulverized thiourea are dissolved in 180 parts of 8–10 per cent caustic soda lye. Into this solution 10 parts of viscose artificial silk are introduced and the mass is kneaded or stirred at room temperature until dissolution occurs, which requires about half-an-hour to two hours. There is produced a solution practically free from undissolved constituents which, spread on a glass plate and treated with dilute sulphuric acid, yields a transparent, flexible film.

(b) The mode of operation is as in (a), with the difference that guanidine is used instead of urea.

(c) The mode of operation is as in (a), with the difference that α-α-dichlorisopropyl-alcohol-carbamic acid ester is used instead of thiourea and the mass is cooled to −11° C. and kept at this temperature for 5 minutes.

The expression "ammonia derivatives of carbon dioxide" in the claims is intended to comprise ammonia derivatives of carbon dioxide and ammonia derivatives of sulphur derivatives of carbon dioxide and such substances or mixtures of such substances as are capable of forming an ammonia derivative of carbon dioxide or an ammonia derivative of a sulphur derivative of carbon dioxide.

I claim:

1. Process for making cellulose solutions, which comprises treating a body of the cellulose group with an ammonia derivative of carbon dioxide in presence of an aqueous alkali solution.

2. Process for making cellulose solutions, which comprises treating a body of the cellulose group with an ammonia derivative of carbon dioxide in presence of an aqueous alkali solution at a temperature below 0° C.

3. Process for making cellulose solutions, which comprises treating a cellulose conversion product with an ammonia derivative of carbon dioxide in presence of an aqueous alkali solution.

4. Process for making cellulose solutions, which comprises treating a cellulose conversion product with an ammonia derivative of carbon dioxide in presence of an aqueous alkali solution at a temperature below 0° C.

5. The process for making a cellulosic solution which comprises dissolving a body of the cellulose group in an aqueous liquid containing a hydroxide of an alkali metal and a urea.

6. Process for making cellulose solutions, which comprises treating a body of the cellulose group with thiourea in presence of an aqueous alkali solution.

7. Process for making cellulose solutions, which comprises treating a body of the cellulose group with thiourea in presence of an aqueous alkali solution at a temperature below 0° C.

8. Process for making cellulose solutions, which comprises treating a cellulose conversion product with a urea in presence of an aqueous alkali solution.

9. Process for making cellulose solutions, which comprises treating a cellulose conversion product with thiourea in presence of an aqueous alkali solution.

10. Process for making cellulose solutions, which comprises treating a body of the cellulose group with an ammonia derivative of carbon dioxide in presence of an aqueous alkali solution at a temperature between 0° and minus 15° C.

11. Process for making cellulose solutions, which comprises treating a body of the cellulose group with an ammonia derivative of carbon dioxide in presence of an aqueous alkali solution of less than 15 per cent strength.

12. Process for making cellulose solutions, which comprises treating a body of the cellulose group with an ammonia derivative of carbon dioxide in presence of an aqueous alkali solution of less than 15 per cent strength at a temperature below 0° C.

13. As new products, solutions of bodies of the cellulose group which solutions essentially contain only water, a body of the cellulose group, except xanthates, caustic alkali and at least one ammonia derivative of carbon dioxide.

14. As new products solutions of bodies of the cellulose group, which solutions essentially contain only water, a body of the cellulose group, except xanthates, caustic alkali and a urea.

15. As new products, solutions of bodies of the cellulose group which solutions essentially contain only water, a body of the cellulose group, except xanthates, caustic alkali and thiourea.

16. As new products, solutions of bodies of the cellulose group which solutions essentially contain only water, a cellulose conversion products, caustic alkali and at least one ammonia derivative of carbon dioxide.

17. As new products, solutions of bodies of the cellulose group which solutions essentially contain only water, a cellulose conversion product, caustic alkali and thiourea.

18. The process for making cellulose solutions by treating a cellulosic material of the character described in the presence of a hydroxide of an alkali metal with an ammonia derivative of the type $$R=C\!\!<^{R_1}_{R_2}$$

where R is an oxygen or sulphur atom, $R_1$ is a $NH_2$ group or derivative thereof, $R_2$ is a $NH_2$ group, a derivative thereof, or is an oxyalkyl group, and C is a carbon atom.

19. The process of making cellulose solutions by treating cellulosic material of the character described at a temperature below 0° C. and in the presence of a hydroxide of an alkali metal with an ammonia derivative of the type $$R=C\!\!<^{R_1}_{R_2}$$

where R is an oxygen or sulphur atom, $R_1$ is a $NH_2$ group or derivative thereof, $R_2$ is a $NH_2$ group, a derivative thereof, or is an oxyalkyl group, and C is a carbon atom.

20. A solution of cellulosic material as herein described, except cellulose xanthates, in an aqueous solution of a hydroxide of an alkali metal containing an ammonia derivative of the type $$R=C\!\!<^{R_1}_{R_2}$$

where R is an oxygen or sulphur atom, $R_1$ is a $NH_2$ group or a derivative thereof, $R_2$ is a $NH_2$ group, a derivative thereof, or is an oxyalkyl group, and C is a carbon atom.

21. The process for making a cellulosic solution which comprises dissolving an undissolved cellulosic body in an aqueous liquid containing a hydroxide of an alkali metal and an ammonia derivative of the type $$R=C\!\!<^{R_1}_{R_2}$$

in which R is an oxygen or sulphur atom, $R_1$ is a $NH_2$ group or derivative thereof, $R_2$ is a $NH_2$ group, a derivative thereof, or is an oxy-alkyl group, C is a carbon atom.

22. The process for making cellulosic solutions which comprises treating cellulose in the presence of aqueous caustic alkali with an ammonia derivative of the type represented by the formula $$R=C\!\!<^{R_1}_{R_2}$$

in which R is an oxygen or sulphur atom, $R_1$ and $R_2$ are $NH_2$ groups or derivatives thereof, C is a carbon atom.

23. The process for making cellulosic solutions which comprises treating cellulose in the presence of aqueous caustic alkali with an ammonia derivative of the type represented by the formula $$R=C\!\!<^{R_1}_{R_2}$$

in which R is an oxygen or sulphur atom, $R_1$ and $R_2$ are $NH_2$ groups, C is a carbon atom.

In testimony whereof I affix my signature.

Dr. LEON LILIENFELD.

CERTIFICATE OF CORRECTION.

Patent No. 1,771,461. July 29, 1930.

LEON LILIENFELD.

It is hereby certified that error appears in the printed specification of the above numbered patent requiring correction as follows: Page 3, line 1, strike out the numeral "288" and insert instead of medicated cotton wool are mixed with 228-288; and that the said Letters Patent should be read with this correction therein that the same may conform to the record of the case in the Patent Office.

Signed and sealed this 16th day of May, A. D. 1939.

Henry Van Arsdale (Seal) Acting Commissioner of Patents.